United States Patent
Yamada et al.

(10) Patent No.: US 8,659,924 B2
(45) Date of Patent: Feb. 25, 2014

(54) POWER CONVERSION APPARATUS

(75) Inventors: Masaki Yamada, Tokyo (JP); Akihiko Iwata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 318 days.

(21) Appl. No.: 13/128,584

(22) PCT Filed: Apr. 8, 2009

(86) PCT No.: PCT/JP2009/001633
§ 371 (c)(1),
(2), (4) Date: May 10, 2011

(87) PCT Pub. No.: WO2010/067467
PCT Pub. Date: Jun. 17, 2010

(65) Prior Publication Data
US 2011/0215651 A1    Sep. 8, 2011

(30) Foreign Application Priority Data
Dec. 12, 2008    (JP) .................................. 2008-316494

(51) Int. Cl.
*H02M 1/42*    (2007.01)
*H02M 7/217*    (2006.01)

(52) U.S. Cl.
USPC ............................................. 363/89; 323/207

(58) Field of Classification Search
USPC ............. 363/15, 16, 34, 71, 95, 97, 125, 131, 363/89, 127; 323/205, 207
See application file for complete search history.

(56) References Cited

U.S. PATENT DOCUMENTS

| | | | |
|---|---|---|---|
| 4,982,148 A * | 1/1991 | Engelmann | 323/207 |
| 6,072,707 A * | 6/2000 | Hochgraf | 363/71 |
| 2002/0180379 A1 | 12/2002 | Shen | |
| 2007/0159279 A1* | 7/2007 | Shimada et al. | 335/40 |
| 2009/0116268 A1 | 5/2009 | Kishida et al. | |
| 2010/0014333 A1* | 1/2010 | Shimada et al. | 363/126 |

FOREIGN PATENT DOCUMENTS

| | | |
|---|---|---|
| JP | 2004 527896 | 9/2004 |
| JP | 2005 223867 | 8/2005 |
| JP | 2007 174723 | 7/2007 |
| JP | 2007 282442 | 10/2007 |
| JP | 2008 289217 | 11/2008 |
| WO | 2007 129456 | 11/2007 |

OTHER PUBLICATIONS

U.S. Appl. No. 13/258,055, filed Sep. 21, 2011, Yamada, et al.
International Search Report issued Jul. 7, 2009 in PCT/JP09/001633 filed Apr. 8, 2009.

* cited by examiner

*Primary Examiner* — Gary L Laxton
(74) *Attorney, Agent, or Firm* — Oblon, Spivak, McClelland, Maier & Neustadt, L.L.P.

(57) ABSTRACT

In a power conversion apparatus that converts AC power to DC power, an inverter circuit including one or more single-phase inverters connected in series with each other is connected in series at the subsequent stage of a rectification of an AC input. At the subsequent stage of the inverter circuit, a smoothing capacitor connected via a rectification diode, and a short-circuiting switch for bypassing the smoothing capacitor are provided. The short-circuiting switch is subjected to ON/OFF control by PWM control such that a voltage of the DC voltage supply of the inverter circuit follows a target voltage. The inverter circuit is subjected to output control such that a DC voltage of the smoothing capacitor follows a target voltage and an input power factor is improved.

20 Claims, 12 Drawing Sheets

US 8,659,924 B2

POWER CONVERSION APPARATUS

TECHNICAL FIELD

The present invention relates to a power conversion apparatus that has a circuit for improving an input power factor and converts AC power into DC power.

BACKGROUND ART

One of conventional power conversion apparatuses is the following step-up AC-DC conversion circuit. A reactor is provided at a connection point between an AC power supply and a diode rectification circuit, a main switching device is connected between the output terminals of the diode rectification circuit, a series circuit including a capacitor and a diode is connected in parallel with the main switching device, and a pair of ends of the capacitor is a DC output. A bridge circuit including a capacitor, and two series circuits each of which includes a diode and a switching device connected in series, the capacitor and the two series circuits being connected in parallel, is provided between the diode rectification circuit and the main switching device, thereby reducing harmonics of an input current in the step-up AC-DC conversion circuit (for example, see Patent Literature 1).

Patent Literature 1: Japanese Laid-Open Patent Publication No. 2007-282442

DISCLOSURE OF THE INVENTION

Problems to be Solved by the Invention

Such a power conversion apparatus as described above reduces harmonics of an input current by controlling charge and discharge of the capacitor of the inverter (bridge circuit). Therefore, a DC voltage supply needs to be externally connected to the power conversion apparatus in order to stabilize a DC bus voltage of the inverter. In addition, if the externally connected DC voltage supply does not have a supply ability sufficiently large relative to transient variations in an AC input power supply and a load, the DC bus voltage of the inverter varies, and therefore it becomes difficult for the power conversion apparatus to stably operate.

The present invention has been made for solving the above problems, and an object of the present invention is, in a power conversion apparatus converting AC power to DC power that has a single-phase inverter to perform input current control for improving the input power factor and voltage control at an output stage, to stabilize a DC bus voltage of the single-phase inverter without the need of an external voltage supply, and to allow the power conversion apparatus to stably operate.

Solution to the Problems

A power conversion apparatus according to the present invention comprises: a rectification circuit for rectifying an input from an AC input power supply; an inverter circuit including one or more single-phase inverters each of which has a plurality of semiconductor switch devices and a DC voltage supply, AC sides of the one or more single-phase inverters being connected in series with each other and being connected in series with an output of the rectification circuit, which inverter circuit superimposes the sum of outputs of the one or more single-phase inverters onto the output of the rectification circuit; a smoothing capacitor for smoothing an output of the inverter circuit, the smoothing capacitor being connected via a rectification diode to the inverter circuit at a subsequent stage of the inverter circuit; and a short-circuiting switch for bypassing the smoothing capacitor, one end of the short-circuiting switch being connected to the inverter circuit and the other end being connected to one end of the smoothing capacitor. The inverter circuit is subjected to output control by using a current instruction such that a voltage of the smoothing capacitor follows a first target voltage and an input power factor from the AC input power supply is improved, and the short-circuiting switch is subjected to ON/OFF control such that a voltage of the DC voltage supply of the inverter circuit follows a second target voltage.

Effect of the Invention

According to the present invention, the short-circuiting switch is controlled so as to cause the voltage of the DC voltage supply of the inverter circuit to be the second target voltage, thereby stabilizing a DC bus voltage of the single-phase inverter without the need of an external voltage supply, and allowing the power conversion apparatus to stably operate.

BEST MODE FOR CARRYING OUT THE INVENTION

Embodiment 1

Figure 1:
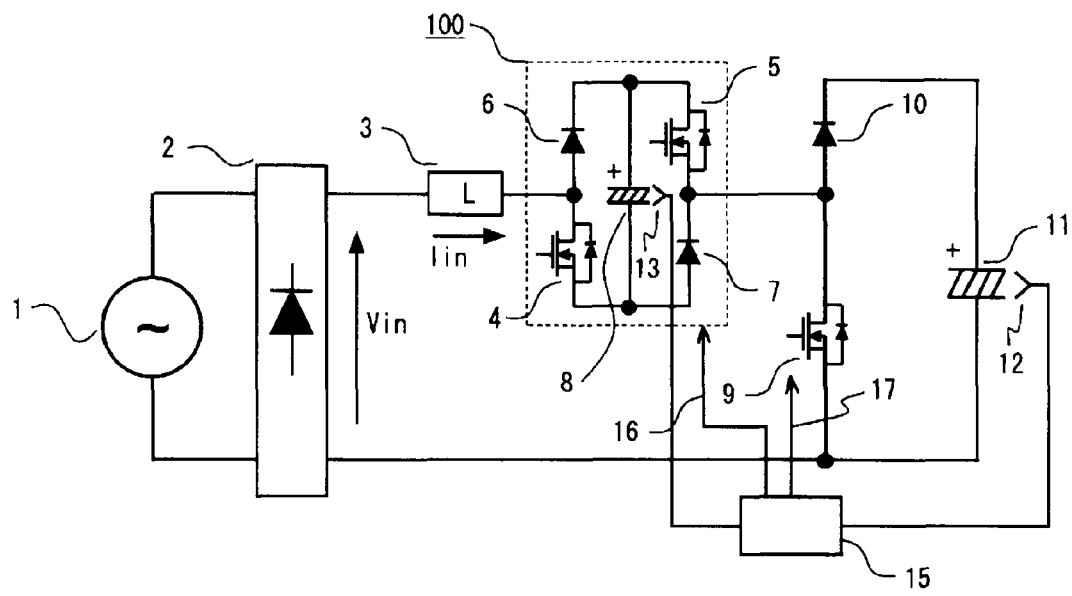
FIG. 1 is a configuration diagram of a power conversion apparatus according to embodiment 1 of the present invention.

Hereinafter, a power conversion apparatus according to embodiment 1 of the present invention will be described. FIG. 1 is a schematic configuration diagram of the power conversion apparatus according to embodiment 1 of the present invention.

As shown in FIG. 1, an AC voltage power supply 1 (hereinafter, simply referred to as an AC power supply 1) which serves as an AC input power supply is connected to a diode bridge 2 which serves as a rectification circuit. The output of the diode bridge 2 is connected to a reactor 3 which serves as a current-limiting component, and the AC side of an inverter circuit 100 including a single-phase inverter is connected in series with the reactor 3, at the subsequent stage of the reactor 3. The single-phase inverter of the inverter circuit 100 includes semiconductor switch devices 4 and 5, diodes 6 and 7, and a DC voltage supply 8. Here, IGBTs (Insulated Gate Bipolar Transistors) having diodes connected in antiparallel with each other, MOSFETs (Metal Oxide Semiconductor Field Effect Transistors) including diodes between the sources and the drains, or the like may be used as the semiconductor switch devices 4 and 5. Semiconductor switch devices may be provided in place of the diodes 6 and 7, as in the semiconductor switch devices 4 and 5. The reactor 3 may be connected in series with the inverter circuit 100, at the subsequent stage of the inverter circuit 100.

In addition, a short-circuiting switch 9 and a rectification diode 10 are connected to the inverter circuit 100, at the subsequent stage of the inverter circuit 100, and the cathode side of the rectification diode 10 is connected to the positive terminal of a smoothing capacitor 11 provided at the output stage. Here, the connection point between one end of the short-circuiting switch 9 and the anode of the rectification diode 10 is connected to an AC output line at the subsequent stage of the inverter circuit 100, and the other end of the short-circuiting switch 9 is connected to the negative terminal of the smoothing capacitor 11.

In addition, voltage detectors 12 and 13 are provided for the smoothing capacitor 11, and the DC voltage supply 8 of the inverter circuit 100, respectively, the voltage detectors 12 and 13 serving as means for monitoring the respective voltages. Each of detected voltages is inputted to a driving control section 15. The semiconductor switch devices 4 and 5 of the inverter circuit 100 are subjected to ON/OFF control by driving signals 16 from the driving control section 15, and the short-circuiting switch 9 of the inverter circuit 100 is subjected to ON/OFF control by a driving signal 17 from the driving control section 15.

Operation of the power conversion apparatus configured as described above will be described based on waveforms in the respective sections shown in FIG. 2.

Figure 2:
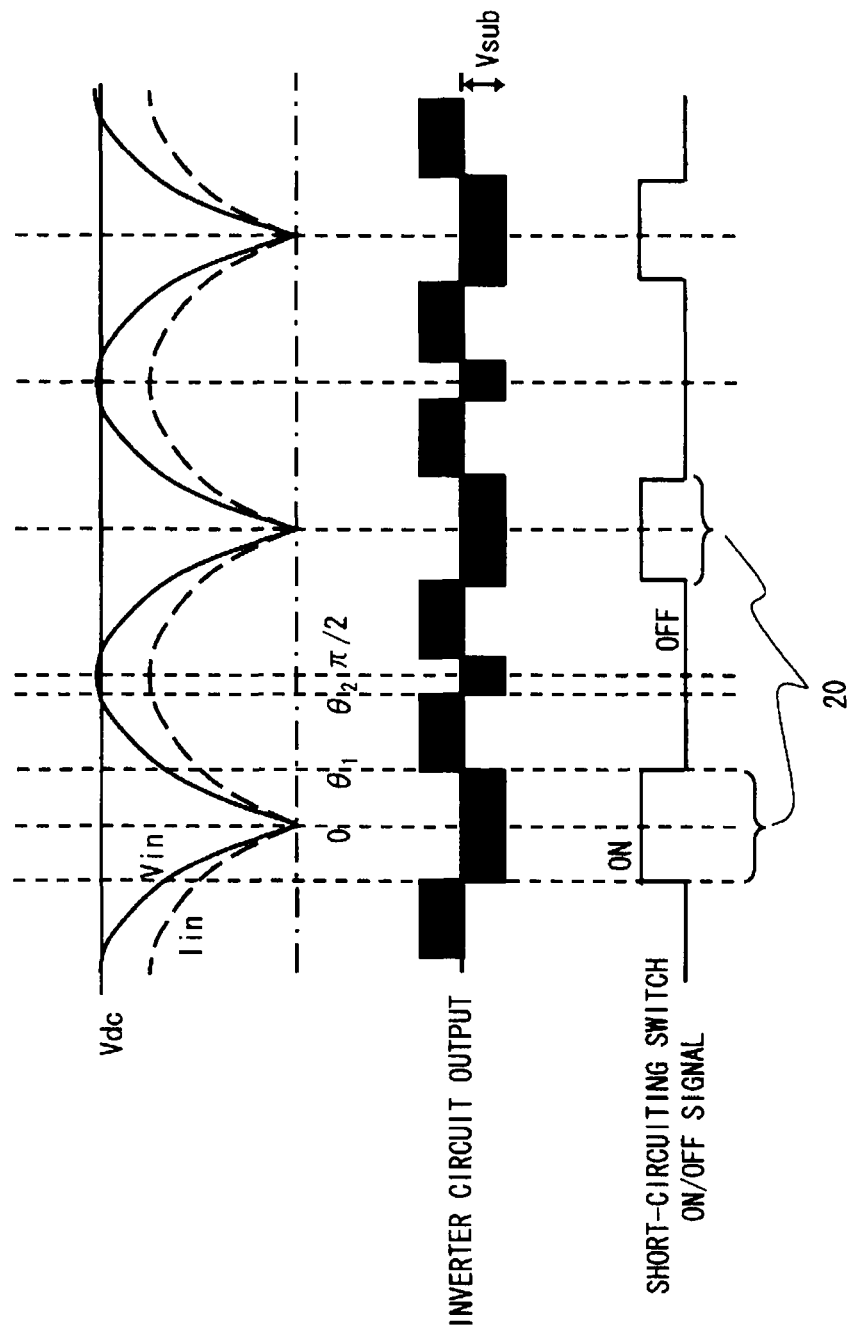
FIG. 2 is a waveform diagram showing waveforms in respective sections for explaining operation of the power conversion apparatus according to embodiment 1 of the present invention.

An input from the AC power supply 1 is subjected to full-wave rectification by the diode bridge 2, whereby the waveforms of a voltage Vin and a current Iin at the subsequent stage of the diode bridge 2 are as shown in FIG. 2. Vdc is a DC voltage of the smoothing capacitor 11 which is controlled so as to be a certain target voltage Vdc* which is a first target voltage. Here, the peak voltage of the voltage Vin is higher than the DC voltage Vdc of the smoothing capacitor 11.

Figure 3:
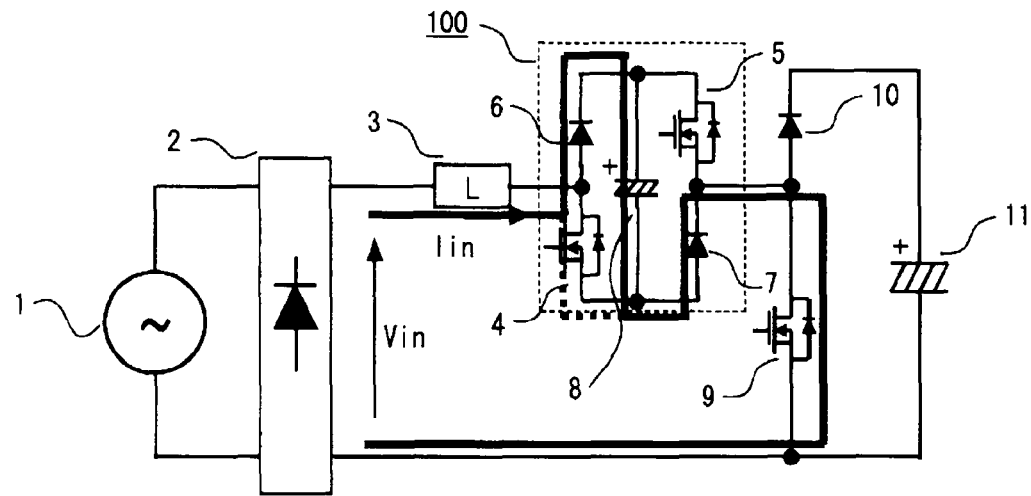
FIG. 3 is a diagram for explaining operation of the power conversion apparatus according to embodiment 1 of the present invention.
Figure 4:
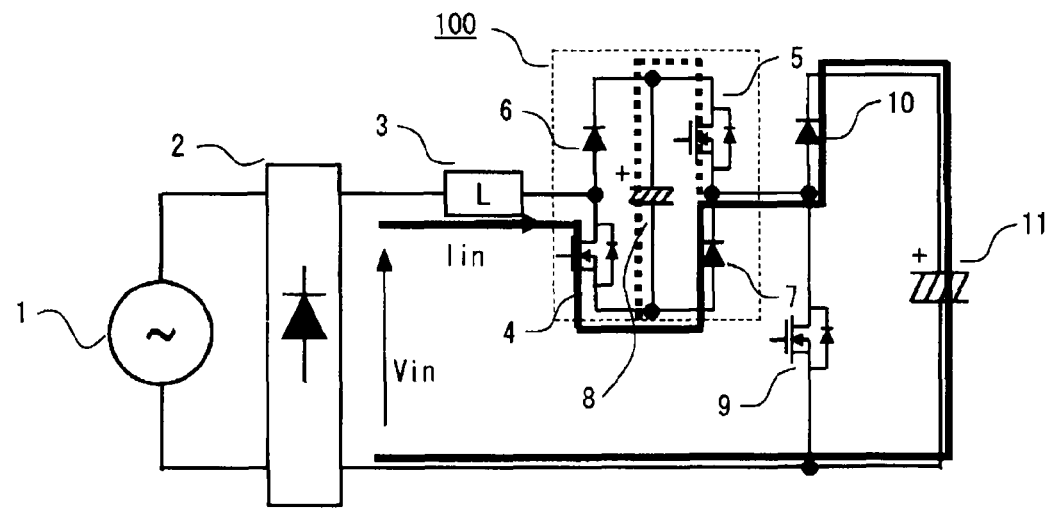
FIG. 4 is a diagram for explaining operation of the power conversion apparatus according to embodiment 1 of the present invention.
Figure 5:
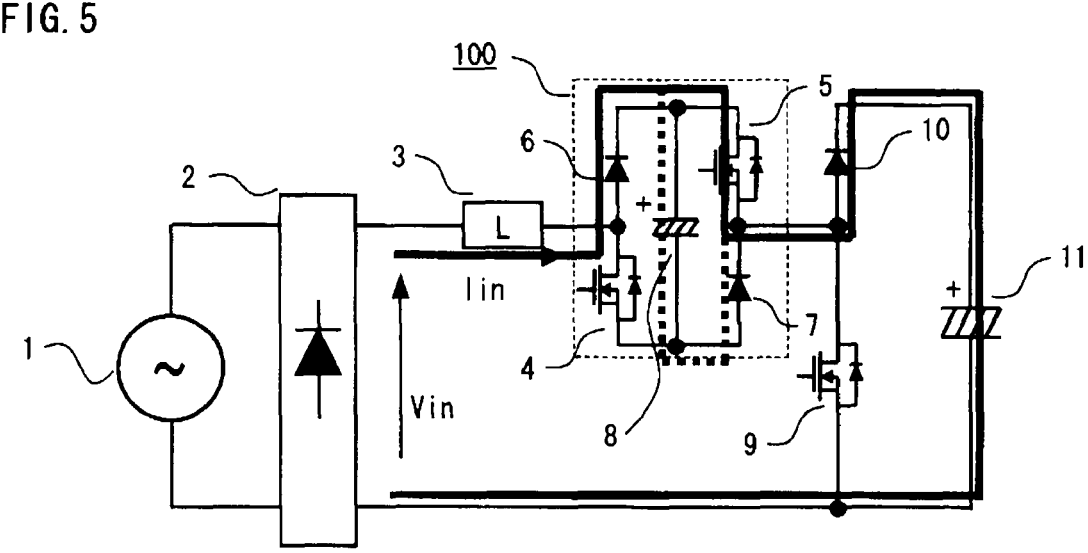
FIG. 5 is a diagram for explaining operation of the power conversion apparatus according to embodiment 1 of the present invention.

The inverter circuit 100 controls and outputs the current Iin by PWM control such that the input power factor from the AC power supply 1 is substantially 1, and superimposes a voltage generated at the AC side onto the voltage Vin at the subsequent stage of the diode bridge 2. As shown in FIG. 3 to FIG. 5, when the semiconductor switch devices 4 and 5 are off, a current in the inverter circuit 100 passes through the diode 6 to charge the DC voltage supply 8, and is outputted through the diode 7. In addition, when only the semiconductor switch device 4 is on, the current is outputted through the semiconductor switch device 4 and the diode 7. In the same manner, when only the semiconductor switch device 5 is on, the current is outputted through the diode 6 and the semiconductor switch device 5. In addition, when both the semiconductor switch devices 4 and 5 are on, the current passes through the semiconductor switch device 4 to discharge the DC voltage supply 8, and is outputted through the semiconductor switch device 5. By using combinations of the four types of control as described above, the semiconductor switch devices 4 and 5 are controlled, thereby performing PWM control for the inverter circuit 100.

The phase of an input voltage from the AC power supply 1 is denoted by $\theta$, and the phase $\theta$ when the voltage Vin is equal to the target voltage Vdc* of the smoothing capacitor 11 is defined as $\theta=\theta 2 (0<\theta 2<\pi/2)$. The short-circuiting switch 9 is turned on only in the period $n\pi-\theta 1<\theta<n\pi+\theta 1 (0<\theta 1<\theta 2)$ (hereinafter, referred to as an ON period 20) which includes the phase $\theta=n\pi$ (n is an integer) which is a zero cross phase, thereby bypassing the smoothing capacitor 11. It is noted that the details of control of the short-circuiting switch 9 will be described later.

Hereinafter, operation when the phase $\theta$ is in the period $0<\theta \leq \pi/2$ will be described.

First, when the phase $\theta$ is in the period $0 \leq \theta \leq \theta 1$, the short-circuiting switch 9 is in the ON period 20. As shown in FIG. 3, a current from the AC power supply 1 flows through the route starting from the AC power supply 1, through the diode bridge 2, the reactor 3, the inverter circuit 100, the short-circuiting switch 9, and the diode bridge 2, to the AC power supply 1. The current does not flow in the rectification diode 10, and the smoothing capacitor 11 at the output stage, because the short-circuiting switch 9 is on. The inverter circuit 100 controls and outputs the current Iin such that the input power factor is substantially 1, while generating a voltage almost equal to an opposite polarity voltage of the voltage Vin by using a combination of, for example, the case where the semiconductor switch devices 4 and 5 are off and the case where only the semiconductor switch device 4 is on, by PWM control. Meanwhile, the DC voltage supply 8 of the inverter circuit 100 is charged with energy.

Next, when the phase $\theta$ is equal to $\theta 1$, the short-circuiting switch 9 is turned off, and then as shown in FIG. 4, the current from the AC power supply 1 flows through the route starting from the AC power supply 1, through the diode bridge 2, the reactor 3, the inverter circuit 100, the rectification diode 10, the smoothing capacitor 11, and the diode bridge 2, to the AC power supply 1.

When the phase $\theta$ is in the period $\theta 1 \leq \theta \leq \theta 2$, the inverter circuit 100 gives its output by a combination of, for example, the case where both the semiconductor switch devices 4 and 5 are on and the case where only the semiconductor switch device 4 is on, by PWM control. At this time, the inverter circuit 100 controls and outputs the current Iin such that the input power factor is substantially 1, while generating a voltage almost equal to Vdc*−Vin so that the DC voltage Vdc of the smoothing capacitor 11 is kept at the target voltage Vdc*. Meanwhile, since the polarity of the voltage generated by the inverter circuit 100 is equal to the polarity of the current Iin, the DC voltage supply 8 of the inverter circuit 100 is discharged.

Next, when the phase $\theta$ is equal to $\theta 2$, the voltage Vin is equal to the DC voltage Vdc* of the smoothing capacitor 11, and the short-circuiting switch 9 continues to be off. However, operation of the inverter circuit 100 varies.

That is, when the phase θ is in the period θ2≤θ≤π/2, as shown in FIG. 5, the current from the AC power supply 1 flows through the route starting from the AC power supply 1, through the diode bridge 2, the reactor 3, the inverter circuit 100, the rectification diode 10, the smoothing capacitor 11, and the diode bridge 2, to the AC power supply 1. In addition, the inverter circuit 100 gives its outputs by a combination of, for example, the case where the semiconductor switch devices 4 and 5 are off and the case where only the semiconductor switch device 5 is on, by PWM control. At this time, since the target voltage Vdc* of the smoothing capacitor 11 is equal to or lower than the voltage Vin, the inverter circuit 100 controls and outputs the current Iin such that the input power factor is substantially 1, while generating a voltage that is almost equal to Vin−Vdc* and has a polarity opposite to that of the voltage Vin so that the DC voltage Vdc of the smoothing capacitor 11 is kept at the target voltage Vdc*. Meanwhile, since the polarity of the voltage generated by the inverter circuit 100 is opposite to the polarity of the current Iin, the DC voltage supply 8 of the inverter circuit 100 is charged.

As shown in FIG. 2, in the phase period π/2≤θ≤π, the inverter circuit 100 operates in a manner symmetrical to that in the phase period 0≤θ≤π/2 described above, and in the phase period π≤θ≤2n, the inverter circuit 100 operates in the same manner as that in the phase period 0≤θ≤π described above.

As described above, each ON period 20, in which the short-circuiting switch 9 is on and the smoothing capacitor 11 is bypassed, is a predetermined period including the phase θ=nπ (n is an integer) which is a zero cross phase of the phase θ of the input voltage from the AC power supply 1. In this period, the inverter circuit 100 controls and outputs the current Iin such that the input power factor is substantially 1, while generating a voltage almost equal to an opposite polarity voltage of the voltage Vin. In phase periods other than the ON periods 20, the inverter circuit 100 keeps the DC voltage Vdc of the smoothing capacitor 11 at the target voltage Vdc*, and controls and outputs the current Iin such that the input power factor is substantially 1. In this case, when the voltage Vin is equal to or lower than the target voltage Vdc* of the smoothing capacitor 11, the DC voltage supply 8 is discharged, and when the voltage Vin is equal to or higher than the target voltage Vdc*, the DC voltage supply 8 is charged.

Figure 6:
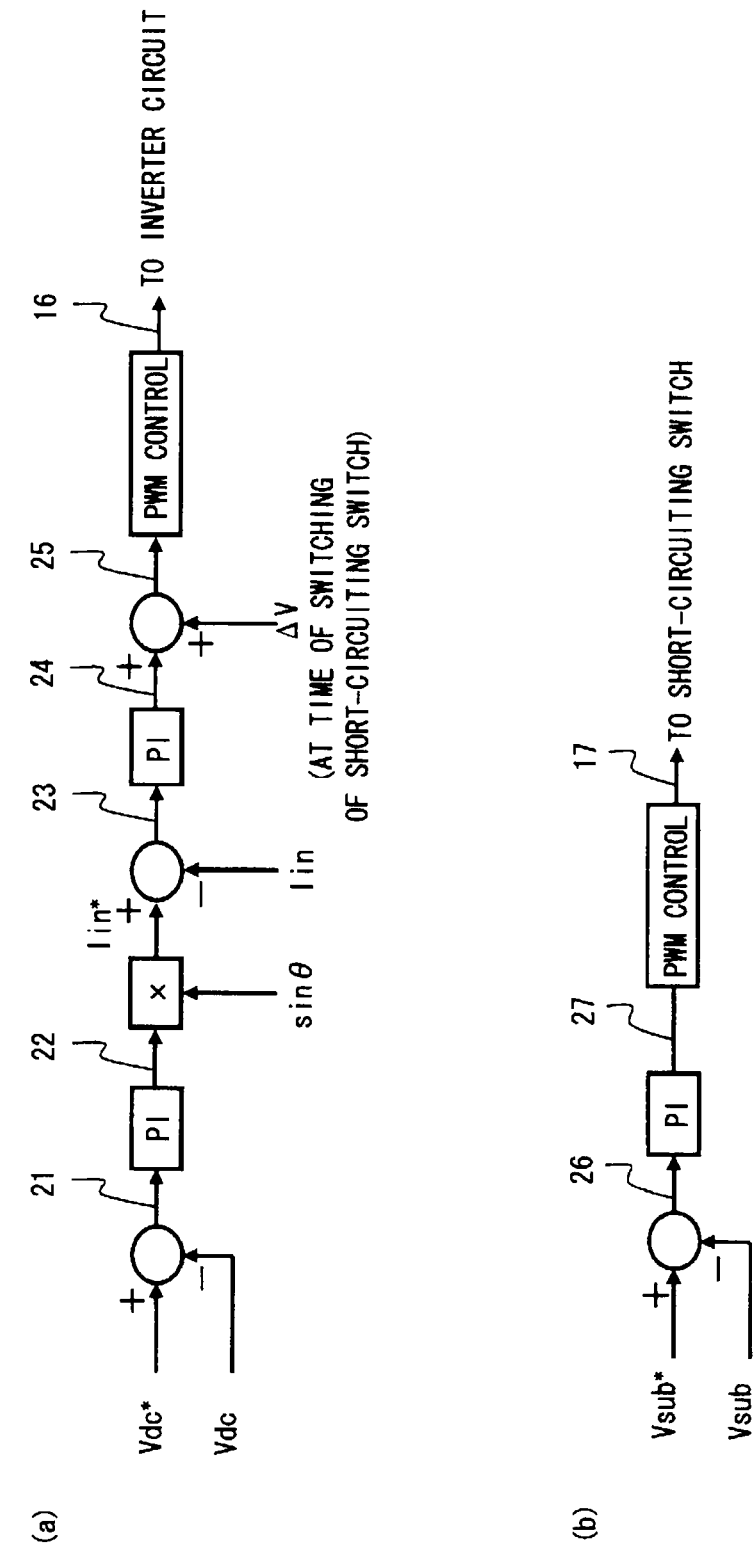
FIG. 6 is a control block diagram showing control of the power conversion apparatus according to embodiment 1 of the present invention.

Next, the details of control by the driving control section 15 will be described below based on control blocks shown in FIG. 6. FIG. 6(a) is a diagram showing control of the inverter circuit 100, and FIG. 6(b) is a diagram showing control of the short-circuiting switch 9.

As shown in FIG. 6(a), in the control of the inverter circuit 100, feedback control (PI control) is performed such that a difference 21 between the DC voltage Vdc of the smoothing capacitor 11 detected by the voltage detector 12, and the target voltage Vdc* of the smoothing capacitor 11 which is set in advance, approaches 0, whereby a target amplitude 22 of the current Tin is determined. Then, based on the target amplitude 22, a current instruction Iin* that is a sine wave synchronized with the voltage Vin is generated.

Next, feedback control (PI control) is performed such that a difference 23 between the current instruction Iin* and the detected current Iin approaches 0, whereby a voltage instruction 24 that is a target value of a voltage generated in the inverter circuit 100 is outputted. At this time, the voltage instruction 24 is corrected by adding thereto a feedforward correction voltage ΔV synchronized with ON/OFF switching timings of the short-circuiting switch 9.

As described above, when the short-circuiting switch 9 is switched from ON to OFF, the DC voltage supply 8 of the inverter circuit 100 is switched from charge to discharge, and when the short-circuiting switch 9 is switched from OFF to ON, the DC voltage supply 8 is switched from discharge to charge. By performing feedforward control at the ON/OFF switching timings, control delay corresponding to a response time in the feedback control, and a voltage generated between both ends of the reactor 3 for current limiting can be cancelled. Thus, a rapid change in the current due to ON/OFF switching of the short-circuiting switch 9 can be reduced. It is noted that when the short-circuiting switch 9 is switched from ON to OFF, the feedforward correction voltage ΔV has a positive polarity, and when the short-circuiting switch 9 is switched from OFF to ON, the feedforward correction voltage ΔV has a negative polarity.

Then, by using the voltage instruction 25 which has been corrected (or the voltage instruction 24 which has not been corrected, in the case other than ON/OFF switching timings of the short-circuiting switch 9), driving signals 16 for the respective semiconductor switch devices 4 and 5 of the inverter circuit 100 are generated by PWM control, thereby operating the inverter circuit 100.

On the other hand, as shown in FIG. 6(b), in the control of the short-circuiting switch 9, a voltage Vsub of the DC voltage supply 8 of the inverter circuit 100 detected by the voltage detector 13 is monitored, and feedback control (PI control) is performed such that a difference 26 between the voltage Vsub and a target voltage Vsub* of the DC voltage supply 8 which is a second target voltage set in advance, approaches 0, thereby obtaining an output 27. By using the output 27, a driving signal 17 for the short-circuiting switch 9 is generated by PWM control, whereby phases in which the short-circuiting switch 9 is on, that is, the ON periods 20 are controlled.

Figure 7:
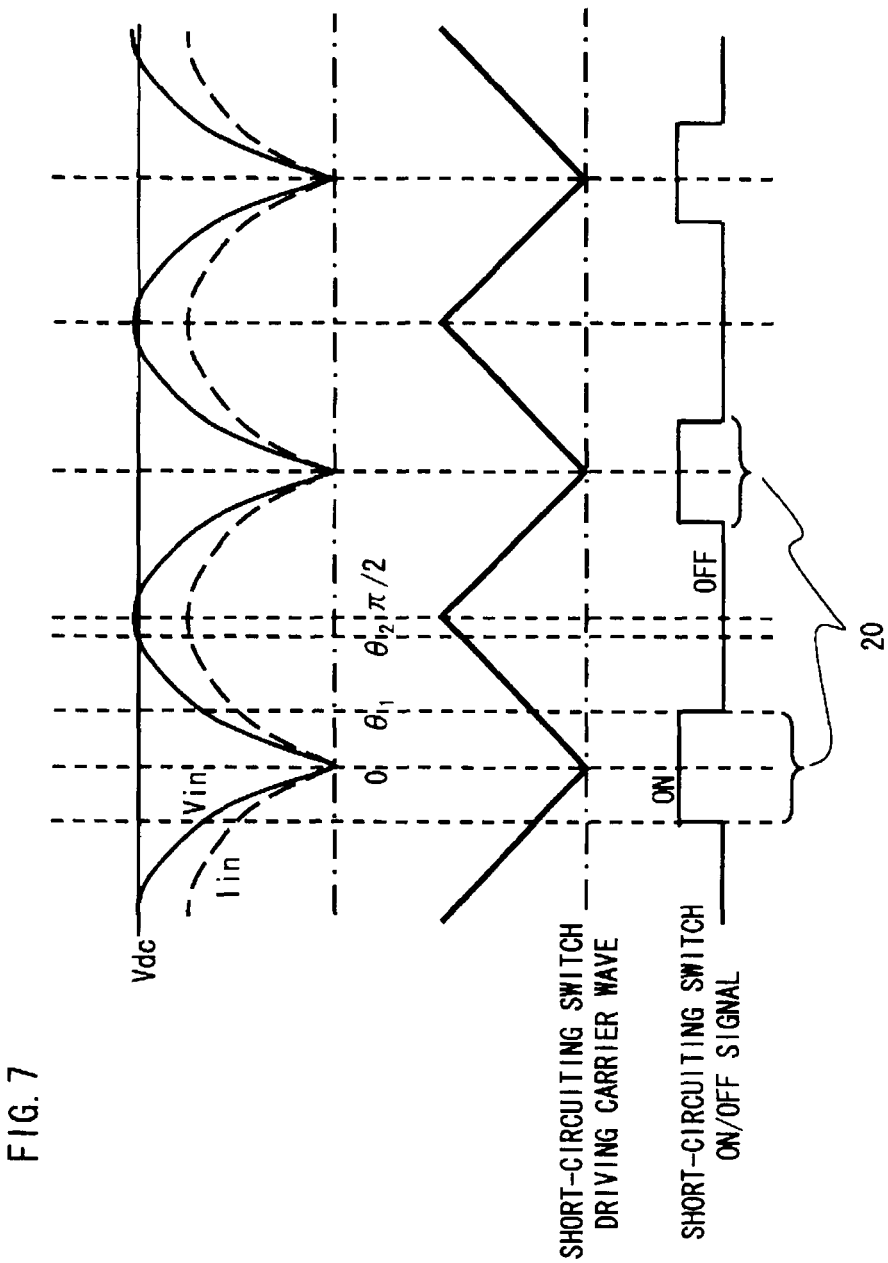
FIG. 7 is a waveform diagram for explaining control of a short-circuiting switch according to embodiment 1 of the present invention.

It is noted that, as shown in FIG. 7, a triangle wave, having a zero phase synchronized with a zero cross phase of the input voltage from the AC power supply 1, in which one triangle waveform is outputted per half wave of the input voltage, is used for a carrier wave used when PWM control is performed for the short-circuiting switch 9. As a result, each of the ON periods 20 includes a zero cross phase of the phase θ of the input voltage from the AC power supply 1.

In the control of the short-circuiting switch 9 as described above, the higher a voltage value obtained by subtracting the voltage Vsub of the DC voltage supply 8 from the target voltage Vsub* is, the longer each ON period of the short-circuiting switch 9 is. Therefore, even if the voltage Vsub varies owing to transient variations in a load and the AC power supply 1, time for charging the DC voltage supply 8 can be controlled, thereby enabling the voltage Vsub of the DC voltage supply 8 to be controlled so as to be constant. Therefore, without the need of an external voltage supply, the voltage of the DC voltage supply 8 of the inverter circuit 100 can be stabilized even against transient variations in the AC power supply 1 and a load, thereby enabling the DC bus voltage of the inverter circuit 100 to be kept constant. Therefore, the power conversion apparatus can stably operate.

In addition, since the neighborhood of a zero cross phase of the input voltage from the AC power supply 1 is included in each ON period 20 of the short-circuiting switch 9, it is not necessary to give an output to the smoothing capacitor 11 in periods in which the voltage Vin is low, and the DC voltage of the inverter circuit 100 can be set so as to be low.

In addition, in the present embodiment, by controlling the inverter circuit 100 by using the current instruction Iin*, the DC voltage Vdc of the smoothing capacitor 11 is caused to follow the target voltage Vdc*, and the input power factor from the AC power supply 1 is improved. High-frequency switching is not needed for the short-circuiting switch 9, and the inverter circuit 100 which improves the input power factor and controls the DC voltage Vdc at the output stage can make a voltage used for switching significantly lower than the peak voltage of the AC power supply 1. Therefore, switching loss and noise can be reduced without the need of a large reactor 3. In addition, when the short-circuiting switch 9 is on, the DC voltage supply 8 of the inverter circuit 100 can be charged while the smoothing capacitor 11 is bypassed. Therefore, it is possible to avoid the current being zero without the inverter circuit 100 generating a high voltage, and to use the charged energy as energy to be discharged to the smoothing capacitor 11. Therefore, the voltage used for switching can be further reduced, thereby further increasing efficiency and further reducing noise.

It is noted that in the above embodiment, the case where a zero cross phase of the input voltage from the AC power supply 1 is at the middle of each ON period 20 (nπ−θ1<θ<nπ+θ1), has been described. However, the ON periods 20 may be determined by detecting, by PWM control, a timing when the short-circuiting switch 9 is switched to ON and a timing when the short-circuiting switch 9 is switched to OFF.

Figure 8:
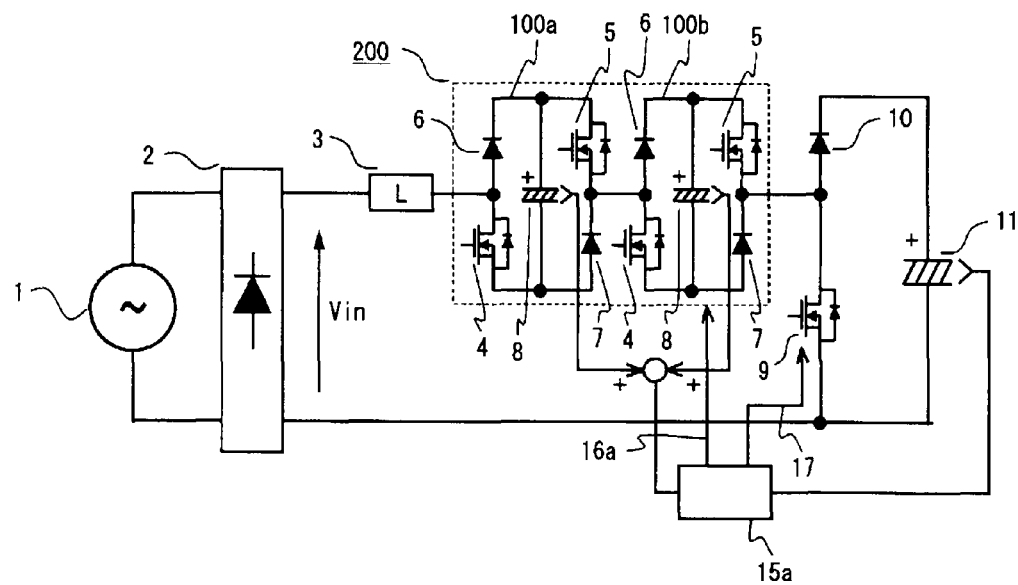
FIG. 8 is a configuration diagram of a power conversion apparatus according to a variation of embodiment 1 of the present invention.

In addition, in embodiment 1, the inverter circuit 100 includes one single-phase inverter. However, as shown in FIG. 8, an inverter circuit 200 including a plurality of single-phase inverters 100a and 100b whose AC sides are connected in series with each other, may be used, thereby providing the same effect as in the above embodiment.

In this case, the sum of outputs of the single-phase inverters 100a and 100b is an output of the inverter circuit 200. The driving control section 15a, in the same manner as in the above embodiment, causes the DC voltage Vdc of the smoothing capacitor 11 to follow the target voltage Vdc* by using a current instruction, and controls the inverter circuit 200 by generating the driving signals 16a for the respective semiconductor switch devices 4 and 5 included in each of the single-phase inverters 100a and 100b such that the input power factor from the AC power supply 1 is improved. Moreover, the driving control section 15a monitors the voltage of the DC voltage supply 8 of each of the single-phase inverters 100a and 100b, and controls the short-circuiting switch 9 by generating the driving signal 17 by PWM control so as to cause the sum of the monitored voltages to follow a target voltage.

Figure 9:
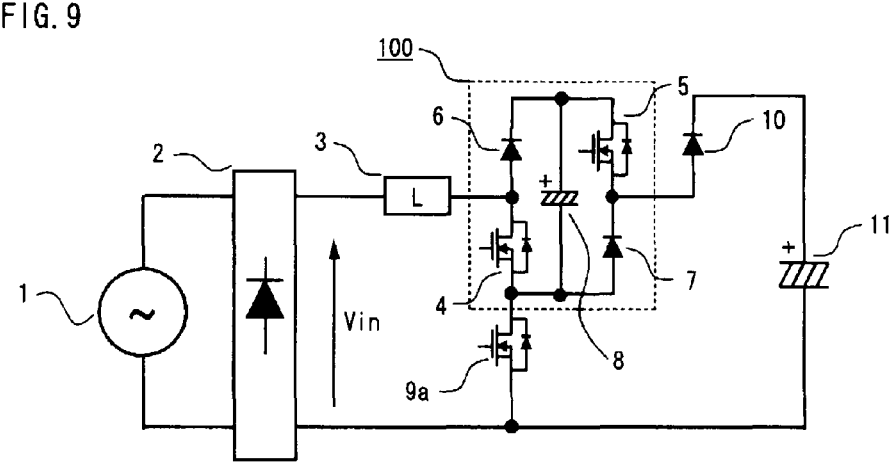
FIG. 9 is a configuration diagram of a power conversion apparatus according to a second variation of embodiment 1 of the present invention.

In addition, in embodiment 1, one end of the short-circuiting switch 9 is connected to the AC output line of the inverter circuit 100. However, as shown in FIG. 9, one end of a short-circuiting switch 9a may be connected to the negative terminal side of the DC voltage supply 8 of the inverter circuit 100. The other end of the short-circuiting switch 9a may be connected to the negative terminal side of the smoothing capacitor 11, that is, to one end of the diode bridge 2, as in embodiment 1.

Figure 10:
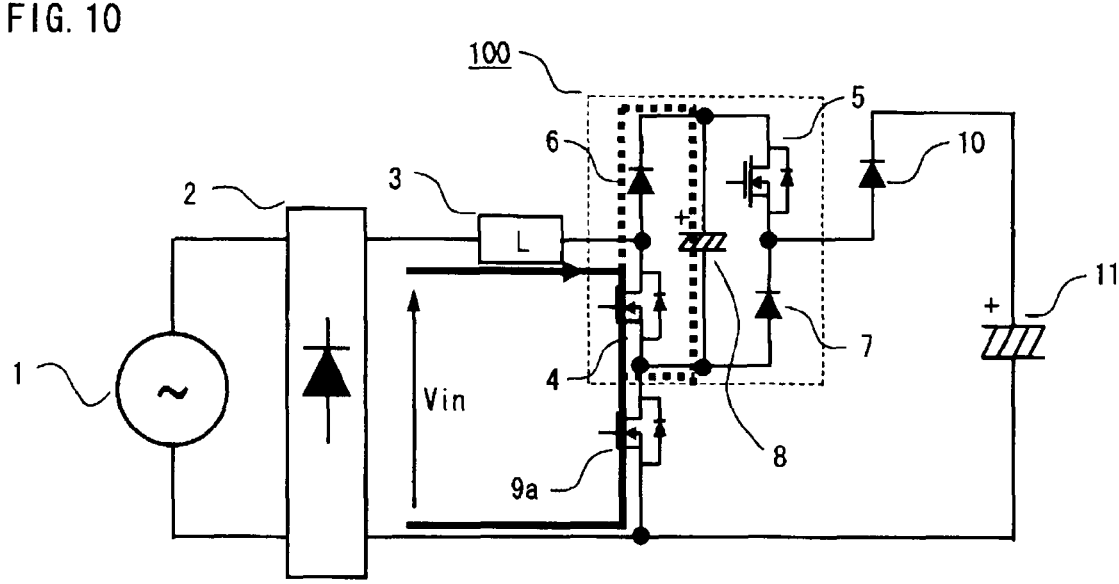
FIG. 10 is a diagram for explaining operation of the power conversion apparatus according to the second variation of embodiment 1 of the present invention.

In this case, control of the inverter circuit 100 and control of the short-circuiting switch 9a are performed in the same manner as in embodiment 1. However, in the ON periods 20 when the short-circuiting switch 9a is on, the current route is as shown in FIG. 10. The current from the AC power supply 1 flows through the route starting from the AC power supply 1, through the diode bridge 2, the reactor 3, the semiconductor switch device 4 of the inverter circuit 100, the short-circuiting switch 9a, and the diode bridge 2, to the AC power supply 1, or the route starting from the AC power supply 1, through the diode bridge 2, the reactor 3, the diode 6 of the inverter circuit 100, the DC voltage supply 8, the short-circuiting switch 9a, and the diode bridge 2, to the AC power supply 1. After the short-circuiting switch 9a is switched off, the current flows through the same current route as in embodiment 1.

As a result, the same effect as in embodiment 1 is obtained. In addition, since the short-circuiting switch 9a is connected to the negative terminal of the DC voltage supply 8, the number of devices that the current passes through when the short-circuiting switch 9a is on can be reduced, whereby conduction loss can be reduced and overall conversion efficiency of the power conversion apparatus can be improved.

It is noted that in the case where the configuration in which the one end of the short-circuiting switch 9a is connected to the negative terminal side of the DC voltage supply 8 is applied to the inverter circuit 200 shown in FIG. 8 including the plurality of single-phase inverters 100a and 100b connected in series with each other, the short-circuiting switch 9a is connected to the negative terminal side of the DC voltage supply 8 of the single-phase inverter 100b, which is one of the plurality of single-phase inverters 100a and 100b that is connected at the last stage. As a result, the power conversion apparatus operates in the same manner and provides the same effect.

Embodiment 2

In embodiment 1, the short-circuiting switch 9 is controlled, by the driving signal 17 being generated by PWM control so as to cause the voltage of the DC voltage supply 8 of the inverter circuit 100 to follow a target voltage. However, in the present embodiment, a generated driving signal is delayed and outputted.

Figure 11:
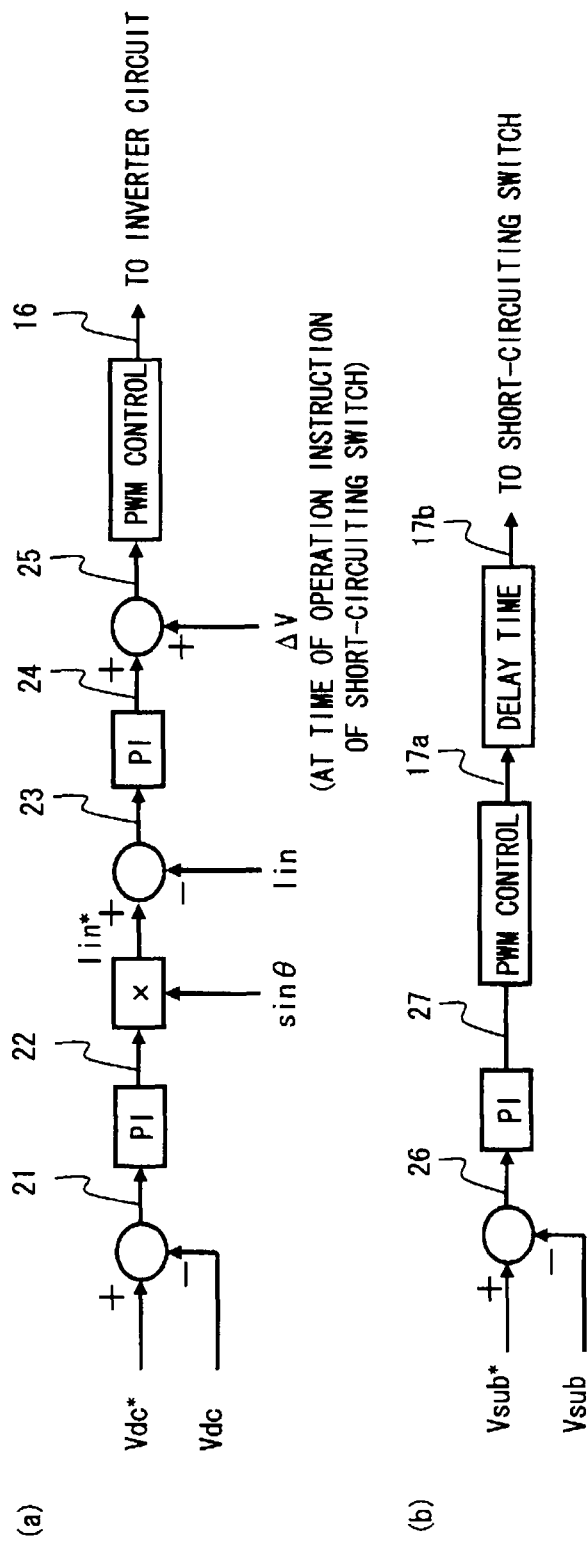
FIG. 11 is a control block diagram showing control of a power conversion apparatus according to embodiment 2 of the present invention.

FIG. 11 is a control block diagram showing control of the inverter circuit 100 and control of the short-circuiting switch 9, according to the present embodiment.

As shown in FIG. 11(b), in the control of the short-circuiting switch 9, in the same manner as in embodiment 1, the voltage Vsub of the DC voltage supply 8 of the inverter circuit 100 detected by the voltage detector 13 is monitored, and feedback control (PI control) is performed such that the difference 26 between the voltage Vsub and the target voltage Vsub* of the DC voltage supply 8 which is a second target voltage set in advance, approaches 0, thereby obtaining the output 27. By using the output 27, a driving signal 17a for the short-circuiting switch 9 is generated by PWM control.

Then, the gate of the short-circuiting switch 9 is driven, with delay of a predetermined delay time, by a driving signal 17b that has been delayed, whereby phases in which the short-circuiting switch 9 is on, that is, the ON periods 20 are controlled.

It is noted that also in this case, each of the ON periods 20 includes a zero cross phase of the phase θ of the input voltage from the AC power supply 1. In addition, in the same manner as in embodiment 1, a triangle wave, having a zero phase synchronized with a zero cross phase of the input voltage from the AC power supply 1, in which one triangle waveform is outputted per half wave of the input voltage, is used for a carrier wave used when PWM control is performed for the short-circuiting switch 9.

Thus, the short-circuiting switch 9 is operated with a delay time from when an ON/OFF switching instruction (operation instruction) for the short-circuiting switch 9 is performed, that is, from the timing when the driving signal 17a for the short-circuiting switch 9 is generated. Therefore, as shown in FIG. 11(a), although the control of the inverter circuit 100 is performed in the same manner as in FIG. 6(a), the feedforward correction voltage ΔV is added to the voltage instruction 24 for the inverter circuit 100 at the timing when the ON/OFF switching instruction for the short-circuiting switch 9 is performed.

Operation of the power conversion apparatus at the time of ON/OFF switching of the short-circuiting switch 9 will be described.

Before the short-circuiting switch 9 is switched on, that is, when the short-circuiting switch 9 is off, the power conversion apparatus operates in the same manner as when the phase θ is in the period θ1≤θ≤θ2 in embodiment 1, and the current route is as shown in FIG. 4. The inverter circuit 100 operates by PWM control such that the DC voltage supply 8 is discharged on average.

In this state, the ON/OFF switching instruction (driving signal 17a) that switches on the short-circuiting switch 9 is generated by PWM control. At this timing, the feedforward signal ΔV that is a voltage having a negative polarity is added to the voltage instruction 24 for the inverter circuit 100. As a result, the inverter circuit 100 operates by PWM control such that the DC voltage supply 8 is charged on average. Therefore, a current flowing in the reactor 3 is decreased.

Then, when the short-circuiting switch 9 is switched on after the predetermined delay time has passed, the power conversion apparatus operates in the same manner as when the phase θ is in the period 0≤θ≤θ1 in embodiment 1, and the current route is as shown in FIG. 3. The inverter circuit 100 continues to operate such that the DC voltage supply 8 is charged on average. Since the current flowing in the reactor 3 has been already reduced when the short-circuiting switch 9 is switched on, an inrush current can be suppressed.

Next, in a state in which the short-circuiting switch 9 is on, the ON/OFF switching instruction (driving signal 17a) that switches off the short-circuiting switch 9 is generated by PWM control. At this timing, the feedforward signal ΔV that is a voltage having a positive polarity is added to the voltage instruction 24 for the inverter circuit 100. As a result, the inverter circuit 100 operates by PWM control such that the DC voltage supply 8 is discharged on average. Therefore, the current flowing in the reactor 3 is increased.

Then, when the short-circuiting switch 9 is switched off after the predetermined delay time has passed, the power conversion apparatus operates in the same manner as when the phase θ is in the period θ1≤θ≤θ2 in embodiment 1, and the current route is as shown in FIG. 4. The inverter circuit 100 continues to operate such that the DC voltage supply 8 is discharged on average. Since the current flowing in the reactor 3 has been already increased when the short-circuiting switch 9 is switched off, a rapid change in the current caused by the DC voltage of the smoothing capacitor 11 at the output side becoming a reverse voltage can be avoided.

As described above, in the present embodiment, the short-circuiting switch 9 is operated with delay from when the ON/OFF switching instruction for the short-circuiting switch 9 is performed, and the inverter circuit 100 is controlled such that charge/discharge operation of the DC voltage supply 9 is switched, by using feedforward control, when the ON/OFF switching instruction for the short-circuiting switch 9 is performed. Thus, distortion of the current waveform occurring when the short-circuiting switch 9 is switched can be effectively reduced, and the power conversion apparatus can more stably operate.

It is noted that in the present embodiment, the reactor 3 is used as a current-limiting component. However, the present invention is not limited to the reactor 3, and a current-limiting component connected to the AC side of the inverter circuit 100 can provide the same effect.

In addition, if the delay time provided when the ON/OFF switching instruction for the short-circuiting switch 9 is performed is set in accordance with the current-limiting component connected to the AC side of the inverter circuit 100, it is possible to more effectively reduce distortion of the current waveform occurring when the short-circuiting switch 9 is switched.

Embodiment 3

In the present embodiment, the case where the driving signals 17 and 17b for the respective short-circuiting switches 9 used in embodiments 1 and 2 are limited, will be described.

Figure 12:
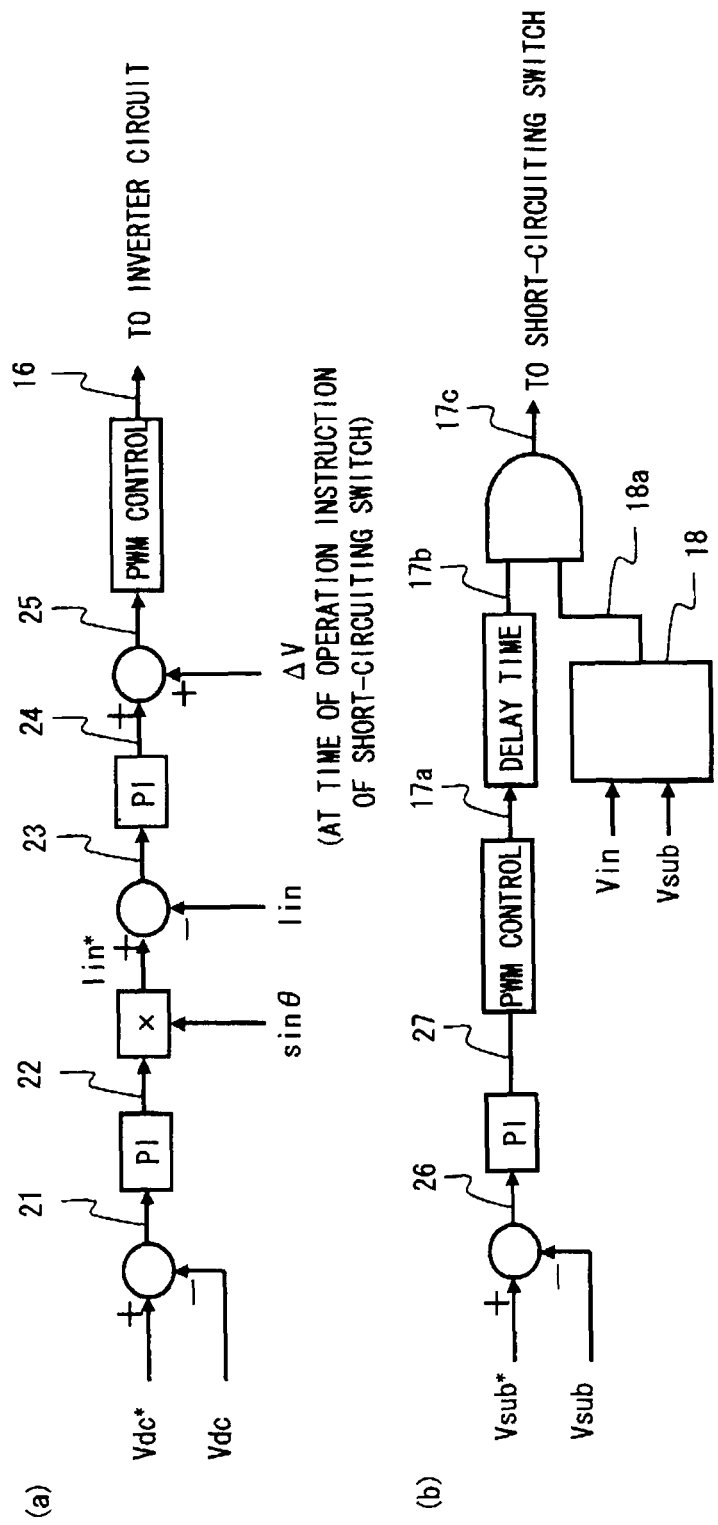
FIG. 12 is a control block diagram showing control of a power conversion apparatus according to embodiment 3 of the present invention.

FIG. 12 is a control block diagram showing control of the inverter circuit 100 and control of the short-circuiting switch 9, according to the present embodiment. Although FIG. 12 shows a configuration in which the driving signal 17b for the short-circuiting switch 9 used in embodiment 2 is limited, the present embodiment can be applied to embodiment 1 in the same manner.

The control of the inverter circuit shown in FIG. 12(*a*) is performed in the same manner as in embodiment 2.

Figure 13:
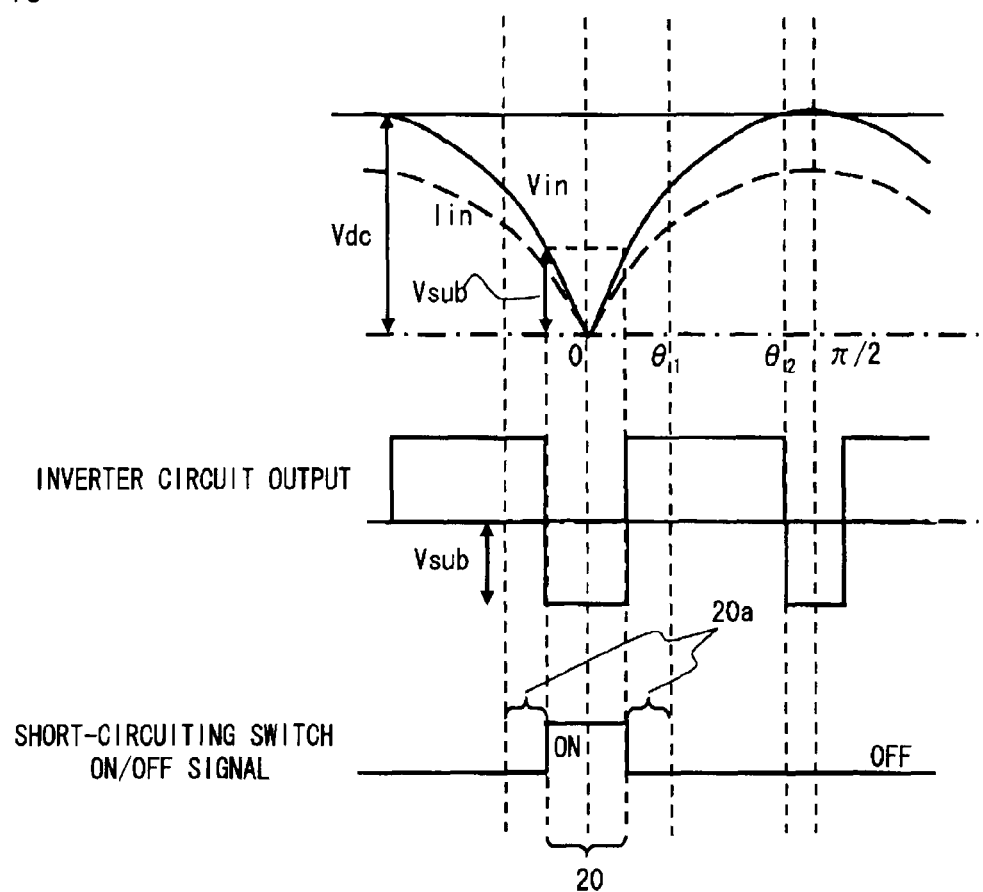
FIG. 13 is a waveform diagram for explaining control of the power conversion apparatus according to embodiment 3 of the present invention.

Hereinafter, the control of the short-circuiting switch 9 will be described based on FIG. 12(*b*) and waveforms in the respective sections of the power conversion apparatus shown in FIG. 13.

An operation prohibition condition determination section 18 for prohibiting operation of the short-circuiting switch 9 is provided in the driving control section 15 of the power conversion apparatus. The voltage Vsub of the DC voltage supply 8 detected by the voltage detector 13, and the absolute value of the input voltage from the AC power supply 1, that is, the voltage Vin at the subsequent stage of the diode bridge 2, are inputted to the operation prohibition condition determination section 18. When the value of the voltage Vin is equal to or higher than the value of the voltage Vsub, the operation prohibition condition determination section 18 outputs an ON-operation prohibition signal 18a for the short-circuiting switch 9.

Then, the driving signal 17b for the short-circuiting switch 9 generated in the same manner as in embodiment 2 is limited by the ON-operation prohibition signal 18a when the value of the voltage Vin is equal to or higher than the value of the voltage Vsub, and the short-circuiting switch 9 is operated by the limited driving signal 17c.

As a result, each ON periods 20 of the short-circuiting switch 9 is narrowed by ON-operation prohibition periods 20a in which the value of the voltage Vin is equal to or higher than the value of the voltage Vsub.

The maximum voltage that can be outputted by the inverter circuit 100 is equal to the voltage Vsub of the DC voltage supply 8. However, in the present embodiment, when the short-circuiting switch 9 is on, the voltage Vin is lower than the maximum output voltage of the inverter circuit 100. Therefore, an inrush current can be prevented.

Therefore, even when the voltage balance is lost because of a transient and rapid change in the AC power supply 1 or a load, the current waveform can be controlled so as to be a sine wave, and therefore the power conversion apparatus can stably operate.

It is noted that in the above embodiment, the operation prohibition condition determination section 18 performs determination such that ON-operation of the short-circuiting switch 9 is prohibited when the value of the voltage Vin is equal to or higher than the value of the voltage Vsub. However, the operation prohibition condition determination section 18 may perform determination such that the ON-operation is prohibited in another condition, by monitoring the voltage Vin, the voltage Vsub, and the DC voltage Vdc of the smoothing capacitor 11.

In addition, in the present embodiment, the ON-operation is prohibited in a predetermined condition. However, OFF-operation may be prohibited as follows.

When the sum of the voltage Vin and the voltage Vsub of the DC voltage supply 8 is lower than the DC voltage Vdc of the smoothing capacitor 11, OFF-operation of the short-circuiting switch 9 is prohibited so that the short-circuiting switch 9 remains to be on. As a result, when the short-circuiting switch 9 is off, the sum of the maximum output voltage of the inverter circuit and the voltage Vin is equal to or higher than the output DC voltage (Vdc), whereby the current can be prevented from being decreased, and distortion of the current waveform can be reduced.

Embodiment 4

In the present embodiment, the case where, in each of embodiments 1 to 3, the output voltage of the inverter circuit 100 is limited when the short-circuiting switch 9 is on, will be described.

Figure 14:
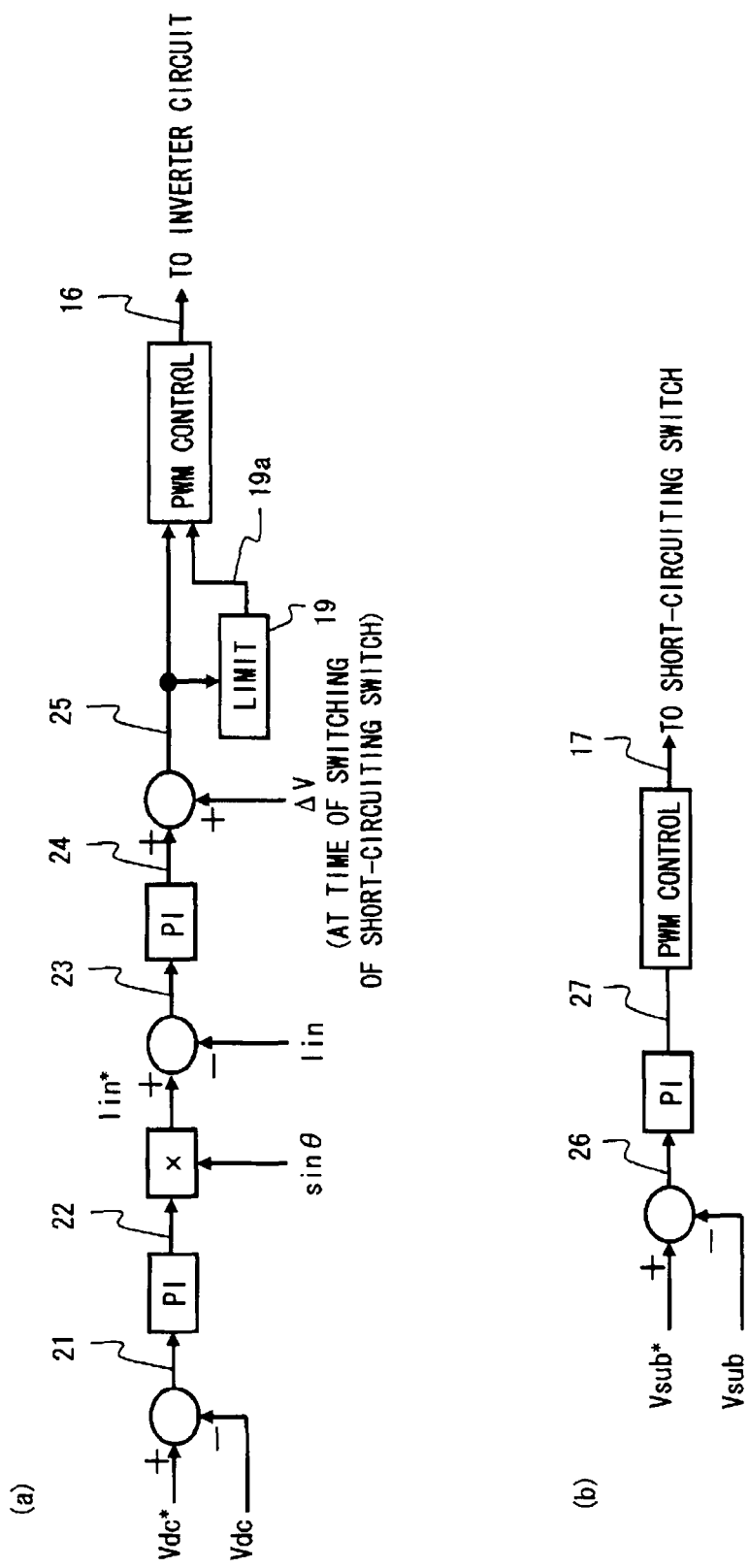
FIG. 14 is a control block diagram showing control of a power conversion apparatus according to embodiment 4 of the present invention.

FIG. 14 is a control block diagram showing control of the inverter circuit 100 and control of the short-circuiting switch 9, according to the present embodiment. Although FIG. 14 shows the case where the present embodiment is applied to embodiment 1, the present embodiment can be applied to embodiments 2 and 3 in the same manner.

Hereinafter, the control of the inverter circuit 100 will be described based on FIG. 14(a). It is noted that the control of the short-circuiting switch 9 shown in FIG. 14(b) is performed in the same manner as in embodiment 1.

An output voltage limiting section 19 shown in FIG. 14 is provided in the driving control section 15 of the power conversion apparatus. As shown in FIG. 14(a), in the control of the inverter circuit 100, in the same manner as in embodiment 1, feedback control (PI control) is performed such that the difference 23 between the current instruction Iin* and the detected current Iin approaches 0, whereby the voltage instruction 24 for the inverter circuit 100 is generated. In addition, the voltage instruction 24 is corrected by adding thereto the feedforward correction voltage ΔV synchronized with ON/OFF switching timings of the short-circuiting switch 9.

Then, in the ON periods in which the short-circuiting switch 9 is on, the voltage instruction 25 which has been corrected (or the voltage instruction 24 which has not been corrected, in the case other than ON/OFF switching timings of the short-circuiting switch 9) is limited by the output voltage limiting section 19 to generate a limited voltage instruction 19a. The output voltage limiting section 19 generates the limited voltage instruction 19a so as to limit the output voltage of the inverter circuit 100 by a predetermined upper limit value. It is noted that when the short-circuiting switch 9 is off, the voltage instruction 25 is used as it is without limiting the output voltage of the inverter circuit 100.

Then, the respective driving signals 16 for the semiconductor switch devices 4 and 5 of the inverter circuit 100 are generated by PWM control, thereby operating the inverter circuit 100.

In the case where the output voltage limiting section 19 sets the upper limit value of the output voltage of the inverter circuit 100 at zero, for example, the inverter circuit 100 operates as follows.

When the output voltage of the inverter circuit 100 is zero, the semiconductor switch device 4 (or 5) is switched on, and the voltage of the AC power supply 1 increases the current Iin so that the current Iin reaches the current instruction Iin*. When the output voltage of the inverter circuit 100 is negative, since the current Iin is larger than the current instruction Iin*, the current Iin is to be decreased. In this case, both the semiconductor switch devices 4 and 5 are switched off, and the voltage of the DC voltage supply 8 becomes a reverse voltage, whereby the current is decreased.

It is noted that when the short-circuiting switch 9 is off, the same operation as in embodiment 1 is performed without limiting the output voltage of the inverter circuit 100.

In this way, by limiting the output voltage of the inverter circuit 100 by a predetermined upper limit value when the short-circuiting switch 9 is on, the current can be prevented from rapidly increasing through the short-circuiting switch 9 when the voltage of the AC power supply 1 and the output voltage of the inverter circuit 100 have the same polarity.

In addition, although the upper limit value is zero in the above description, the present invention is not limited thereto. By limiting the output voltage, rapid increase in the current can be suppressed.

The invention claimed is:

1. A power conversion apparatus, comprising:
a rectification circuit for rectifying an input from a single-phase AC input power supply;
an inverter circuit including at least one single-phase inverter having a plurality of semiconductor switch devices and a DC voltage supply, an AC side of the at least one single-phase inverter being connected in series with an output of the rectification circuit, which inverter circuit superimposes a sum of outputs of the at least one single-phase inverter onto the output of the rectification circuit;
a smoothing capacitor for smoothing an output of the inverter circuit, the smoothing capacitor being connected via a rectification diode to the inverter circuit at a subsequent stage of the inverter circuit; and
a short-circuiting switch for bypassing the smoothing capacitor, one end of the short-circuiting switch being connected to the inverter circuit and the other end being connected to one end of the smoothing capacitor,
wherein:
the inverter circuit is subjected to output control by PWM control using a current instruction such that a voltage of the smoothing capacitor follows a first target voltage and an input power factor from the single-phase AC input power supply is improved,
the short-circuiting switch is subjected to ON/OFF control such that a voltage of the DC voltage supply of the inverter circuit follows a second target voltage, and
each of ON periods of the short-circuiting switch includes a zero cross phase of an input voltage from the single-phase AC input power supply.

2. The power conversion apparatus according to claim 1, wherein:
the short-circuiting switch is subjected to ON/OFF control by PWM control, and
a carrier wave used for the PWM control is a triangle wave, having a zero phase synchronized with the zero cross phase of the input voltage from the single-phase AC input power supply, in which one triangle waveform is outputted per half wave of the input voltage.

3. The power conversion apparatus according to claim 1, wherein the higher a voltage value obtained by subtracting the voltage of the DC voltage supply from the second target voltage, the longer the ON periods of the short-circuiting switch are.

4. The power conversion apparatus according to claim 1, wherein in the ON periods of the short-circuiting switch, ON-operation of the short-circuiting switch is prohibited in a predetermined condition based on the input voltage from the single-phase AC input power supply, the voltage of the DC voltage supply, and the voltage of the smoothing capacitor.

5. The power conversion apparatus according to claim 4, wherein the predetermined condition is that the magnitude of the input voltage from the single-phase AC input power supply is equal to or higher than the voltage of the DC voltage supply.

6. The power conversion apparatus according to claim 1, wherein when a sum of an absolute value of the input voltage from the single-phase AC input power supply and the voltage of the DC voltage supply is lower than the voltage of the smoothing capacitor, OFF-operation of the short-circuiting switch is prohibited.

7. The power conversion apparatus according to claim 1, wherein in the ON periods of the short-circuiting switch, an output voltage of the inverter circuit is limited by a predetermined upper limit value.

8. The power conversion apparatus according to claim 1, wherein
 a delay time is set for ON/OFF switching of the short-circuiting switch so that the short-circuiting switch is operated with delay from when an ON/OFF switching instruction for the short-circuiting switch is performed, and
 the inverter circuit is controlled so as to switch charge/discharge operation of DC power, when the ON/OFF switching instruction for the short-circuiting switch is performed.

9. The power conversion apparatus according to claim 8, wherein the delay time is determined in accordance with a current-limiting component of a circuit connected to an AC side of the inverter circuit.

10. The power conversion apparatus according to claim 1, wherein the one end of the short-circuiting switch is connected to an AC output line at the subsequent stage of the inverter circuit.

11. The power conversion apparatus according to claim 1, wherein the one end of the short-circuiting switch is connected to one end of the DC voltage supply of the at least one single-phase inverter that is connected at the subsequent stage of the inverter circuit.

12. A power conversion apparatus, comprising:
 a rectification circuit for rectifying an input from a single-phase AC input power supply;
 an inverter circuit including a plurality of single-phase inverters each of which has a plurality of semiconductor switch devices and a DC voltage supply, AC sides of each of the plurality of single-phase inverters being connected in series with each other and being connected in series with an output of the rectification circuit, which inverter circuit superimposes a sum of outputs of the plurality of single-phase inverters onto the output of the rectification circuit;
 a smoothing capacitor for smoothing an output of the inverter circuit, the smoothing capacitor being connected via a rectification diode to the inverter circuit at a subsequent stage of the inverter circuit; and
 a short-circuiting switch for bypassing the smoothing capacitor, one end of the short-circuiting switch being connected to the inverter circuit and the other end being connected to one end of the smoothing capacitor,
 wherein:
  the inverter circuit is subjected to output control by PWM control using a current instruction such that a voltage of the smoothing capacitor follows a first target voltage and an input power factor from the single-phase AC input power supply is improved,
  the short-circuiting switch is subjected to ON/OFF control by PWM control such that a voltage of the DC voltage supply of the inverter circuit follows a second target voltage, and
  each of ON periods of the short-circuiting switch includes a zero cross phase of an input voltage from the single-phase AC input power supply.

13. The power conversion apparatus according to claim 12, wherein the short-circuiting switch is subjected to ON/OFF control by PWM control, and a carrier wave used for the PWM control is a triangle wave, having a zero phase synchronized with the zero cross phase of the input voltage from the single-phase AC input power supply, in which one triangle waveform is outputted per half wave of the input voltage.

14. The power conversion apparatus according to claim 12, wherein in the ON periods of the short-circuiting switch, ON-operation of the short-circuiting switch is prohibited in a predetermined condition based on the input voltage from the single-phase AC input power supply, the voltage of the DC voltage supply, and the voltage of the smoothing capacitor.

15. The power conversion apparatus according to claim 12, wherein in the ON periods of the short-circuiting switch, ON-operation of the short-circuiting switch is prohibited in a condition that the magnitude of the input voltage from the single-phase AC input power supply is equal to or higher than the voltage of the DC voltage supply.

16. The power conversion apparatus according to claim 12, wherein when a sum of an absolute value of the input voltage from the single-phase AC input power supply and the voltage of the DC voltage supply is lower than the voltage of the smoothing capacitor, OFF-operation of the short-circuiting switch is prohibited.

17. The power conversion apparatus according to claim 12, wherein
 a delay time is set for ON/OFF switching of the short-circuiting switch so that the short-circuiting switch is operated with delay from when an ON/OFF switching instruction for the short-circuiting switch is performed, and
 the inverter circuit is controlled so as to switch charge/discharge operation of DC power, when the ON/OFF switching instruction for the short-circuiting switch is performed.

18. The power conversion apparatus according to claim 17, wherein the delay time is determined in accordance with a current-limiting component of a circuit connected to an AC side of the inverter circuit.

19. The power conversion apparatus according to claim 12, wherein the one end of the short-circuiting switch is connected to an AC output line at the subsequent stage of the inverter circuit.

20. The power conversion apparatus according to claim 12, wherein the one end of the short-circuiting switch is connected to one end of the DC voltage supply of a last one of the plurality of single-phase inverters included in the inverter circuit that is connected at a last stage of the inverter circuit.

* * * * *